(12) United States Patent
Wang et al.

(10) Patent No.: US 8,694,275 B2
(45) Date of Patent: Apr. 8, 2014

(54) METHOD, DEVICE AND SYSTEM FOR CALIBRATING POSITIONING DEVICE

(75) Inventors: Yongcai Wang, Beijing (CN); Junhui Zhao, Beijing (CN); Toshikazu Fukushima, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 0 days.

(21) Appl. No.: 13/557,754

(22) Filed: Jul. 25, 2012

(65) Prior Publication Data

US 2012/0290256 A1 Nov. 15, 2012

Related U.S. Application Data

(62) Division of application No. 12/634,266, filed on Dec. 9, 2009, now Pat. No. 8,306,769.

(30) Foreign Application Priority Data

Jan. 16, 2009 (CN) .......................... 2009 1 0002077

(51) Int. Cl.
*G01C 17/38* (2006.01)
*G01C 9/00* (2006.01)

(52) U.S. Cl.
USPC .............. 702/94; 342/450; 702/150; 702/152

(58) Field of Classification Search
USPC ..................... 702/94, 95, 122, 150–152, 158;
340/539.13; 342/27, 417, 450;
455/456.1
See application file for complete search history.

(56) References Cited

U.S. PATENT DOCUMENTS

| 2002/0122003 | A1 | 9/2002 | Patwari et al. |
| 2007/0173266 | A1* | 7/2007 | Barnes, Jr. ................. 455/456.1 |
| 2008/0074264 | A1 | 3/2008 | Sharpe et al. |

FOREIGN PATENT DOCUMENTS

| JP | 2008-107251 A | 5/2008 |
| JP | 2008-299592 A | 12/2008 |

OTHER PUBLICATIONS

Japanese Office Action issued in corresponding Japanese Patent Application No. 2009-279842 on Sep. 22, 2011.
Chinese Office Action dated Nov. 25, 2013 issued in Chinese Application No. 201210407035.8.

* cited by examiner

*Primary Examiner* — John H Le
(74) *Attorney, Agent, or Firm* — Sughrue Mion, PLLC

(57) ABSTRACT

Embodiments of the present invention provide not only a technical solution for calibrating a positioning device but also a technical solution for characterizing an area of interest in a space. Specifically, there is provided a system, which may include: a tag capable of emitting ranging signals, placed at location points which are selected as space feature points in the space; a positioning device in the space, configured to obtain relative coordinates of the space feature points in relation to the positioning device based on the ranging signals from the tag; and a server, configured to determine location parameters of the positioning device in the space based on the relative coordinates, so as to calibrate the positioning device. The positioning device can be calibrated automatically, fast and accurately using the system.

14 Claims, 11 Drawing Sheets

METHOD, DEVICE AND SYSTEM FOR CALIBRATING POSITIONING DEVICE

This application is a divisional application of U.S. application Ser. No. 12/634,266 filed Dec. 9, 2009, which claims priority from Chinese Patent Application No. 200910002077.1 filed on Jan. 16, 2009, which applications are incorporated herein by reference.

FIELD OF THE INVENTION

The present invention relates to the field of positioning technology and, more particularly, to a method, device, and system for calibrating a positioning device and to a method, device, and system for characterizing an area of interest in a space.

BACKGROUND OF THE INVENTION

Location information is a fundamental context to be utilized to extract the geographical relationship between users and environments to further understand and learn the users' behaviors. The importance and promise of location-aware applications has led to the design and implementation of systems for providing location information. Currently, some high accuracy indoor positioning systems (Ha-IPSs) are developed to accurately track people and assets in real time, in many different application scenarios including office, healthcare, coalmine, subway, smart building, restaurant, and other environments.

Currently, these Ha-IPSs are typically ultrasound based or ultra-wideband-radio based. Their common character is to provide positioning accuracy of centimeter level. In some application scenarios of such Ha-IPSs, some positioning devices need be deployed and calibrated in the relevant environment in order to monitor the locations of moving objects in some Areas of Interest (AOI). Generally, positioning systems like Ha-IPSs can track the locations of these moving objects in real time so as to provide certain location-based service. For instance, in an office environment, when positioning devices such as Ha-IPSs are deployed, locations of terminals or employees can be tracked. Therefore, location-based access rules can be designed to define certain "secure zone." Only within such a zone, access to confidential information databases can be allowed; beyond or out of the zone, any access will be prohibited. The above-noted secure zone may be a room, part of a working area, or even a table.

So far, varieties of Ha-IPSs have been developed to provide the geographical relationship between users and environments. In these Ha-IPSs, the positioning and geographical relationship determination process can be summarized as three phases.

1. Ha-IPS setting up phase, which can comprise the steps of:

1) calibrating the locations of reference points. The reference point locations refer to the locations of positioning devices or beacons when calculating the location of an object point, the locations of positioning devices or reference points must be known in advance and are used as calculation references in a positioning algorithm.

2) configuring the size of a reference space. The reference space means a space in which the object is moving, such as a room and an office. In order to learn the geographical relationship of the object to the environment, the size of the reference space must be known.

3) characterizing the Area of Interest. The Area of Interest (AOI) means a geographical area which is characterized by a user for some specific application requirements (such as for security purposes). The Area of Interest is located in the reference space. For example, in "Secure Table" application, the table is defined as the Area of Interest. Only within the Area of Interest, access to confidential information is allowed; beyond or out of the Area of Interest, any access to the confidential information is prohibited.

In the Ha-IPS setting up phase, since errors in reference point calibration will be inherited to the object positioning process, sufficiently accurate calibration is required. Additionally, since the positioning devices are commonly deployed on the ceiling, a calibration process with few human efforts is especially desired. Furthermore, since measuring a practical environment involves lots of human efforts, an accurate, fast and automatic reference space configuration method is especially desired.

2. Ha-IPS online locating phase. In this phase, the real-time location of the object point is calculated based on a measured distance of the object and the calibrated reference points' coordinates.

3. Geographical relationship inferring phase. In this phase, the object's geographical relation to the reference space and Areas of Interest is inferred based on the definitions of the reference space and Areas of Interest and the real-time location of the object point as calculated in the second phase. In this process, lots of measurement and recording efforts are spent because Areas of Interest are mainly characterized manually.

As discussed above, a common defect in the existing Ha-IPSs is that the configuration, calibration, and characterization thereof require enormous efforts. Hence, the use of the existing Ha-IPSs is not quite convenient, nor does it meet user-friendly requirements.

Therefore, there is a dire need in the art for a technical solution to automatically configure and calibrate a positioning device and also for a technical solution to automatically characterize an area of interest in a space.

SUMMARY OF THE INVENTION

An object of the present invention is to provide a technical solution for automatically configuring and calibrating a positioning device.

Another object of the present invention is to provide a technical solution for automatically characterizing an area of interest in a space.

According to a first aspect of the present invention, there is provided a system. The system may comprise: a tag capable of emitting ranging signals, placed at one or more location points which are selected as space feature points in a space; a positioning device in said space, configured to obtain relative coordinates of said space feature points in relation to the positioning device based on the ranging signals from the tag; and a server, configured to determine location parameters of said positioning device in said space based on said relative coordinates, so as to calibrate said positioning device.

According to a second aspect of the present invention, there is provided a system. The system may comprise: a tag capable of emitting ranging signals, placed at one ore more location points in a space; a first calibrated positioning device, configured to obtain absolute coordinates of said location points in said space based on the ranging signals from the tag; a second positioning device, configured to obtain relative coordinates of said location points in relation to said second positioning device based on the ranging signals from the tag; and a server, configured to determine location parameters of said second positioning device in said space based on said absolute coordinates and said relative coordinates, so as to calibrate said second positioning device, wherein said location points are located in an overlapped coverage area between said first calibrated positioning device and said second positioning device.

According to a third aspect of the present invention, there is provided a system. The system may comprise: a tag capable of emitting ranging signals, placed at area of interest (AOI) feature points which can characterize an area of interest in a space; a positioning device in said space, configured to obtain location parameters of said AOI feature points based on the ranging signals from the tag; and a server, configured to characterize said area of interest based on the location parameters of said AOI feature points.

According to a fourth aspect of the present invention, there is provided a method for calibrating a positioning device in a space, wherein one or more location points in the space are selected as space feature points. The method may comprise: receiving relative coordinates of said space feature points in relation to said positioning device; and determining location parameters of said positioning device in said space based on said relative coordinates, so as to calibrate said positioning device.

According to a fifth aspect of the present invention, there is provided a method for calibrating a positioning device. The method may comprise: receiving absolute coordinates of one or more location points in a space and relative coordinates of said location points in relation to said positioning device; and determining location parameters of said positioning device in said space based on said absolute coordinates and said relative coordinates, so as to calibrate said positioning device.

According to a sixth aspect of the present invention, there is provided a method for characterizing an area of interest in a space. The method may comprise: receiving location parameters of area of interest (AOI) feature points which can characterize the area of interest, wherein said location parameters are obtained by a positioning device deployed in the space; and characterizing said area of interest based on said location parameters.

According to a seventh aspect of the present invention, there is provided a device for calibrating a positioning device deployed in a space, wherein one or more location points in the space are selected as space feature points. The device may comprise: receiving means for receiving relative coordinates of said space feature points in relation to said positioning device; and determining means for determining location parameters of said positioning device in said space based on said relative coordinates, so as to calibrate said positioning device.

According to an eighth aspect of the present invention, there is provided a device for calibrating a positioning device. The device may comprise: receiving means for receiving absolute coordinates of one ore more location points in a space and relative coordinates of said location points in relation to said positioning device; and determining means for determining location parameters of said positioning device in said space based on said absolute coordinates and said relative coordinates, so as to calibrate said positioning device.

According to a ninth aspect of the present invention, there is provided a device for characterizing an area of interest in a space. The device may comprise: receiving means for receiving location parameters of area of interest (AOI) feature points which can characterize said area of interest, wherein said location parameters are obtained by a positioning device deployed in the space; and characterizing means for characterizing said area of interest based on said location parameters.

The advantageous effect of embodiments of the present invention is that manual measurements of various location parameters and size are reduced and even are not needed during the processes of calibrating and configuring the positioning device. As a result, considerable human cost is saved, work efficiency increased, and positioning accuracy improved. Furthermore, according to an embodiment of the present invention, it is possible to automatically characterize an area of interest in a space.

BRIEF DESCRIPTION ON THE DRAWINGS

As the present invention is better understood, other objects and effects of the present invention will become more apparent and easy to understand from the following description, taken in conjunction with the accompanying drawings wherein.

Figure 15A:
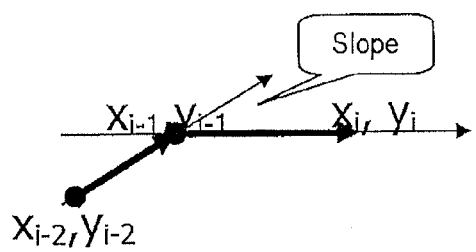
Figure 15B:
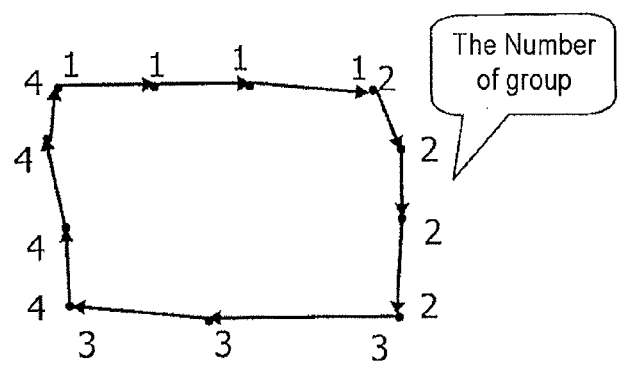
Figure 16:
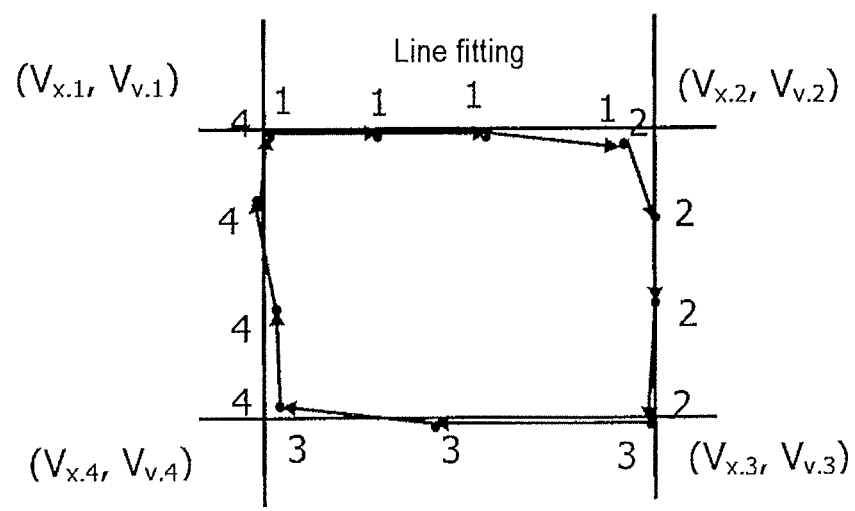
Figure 17:
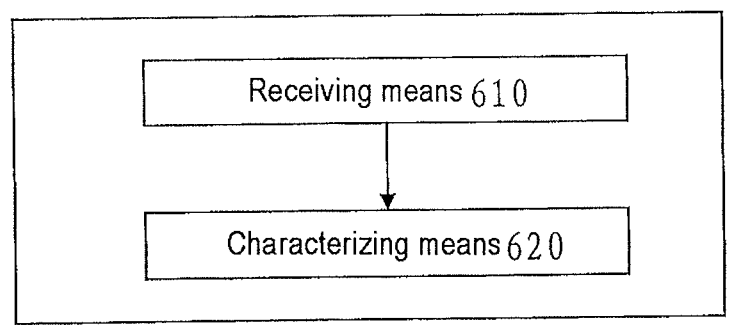
Figure 18:
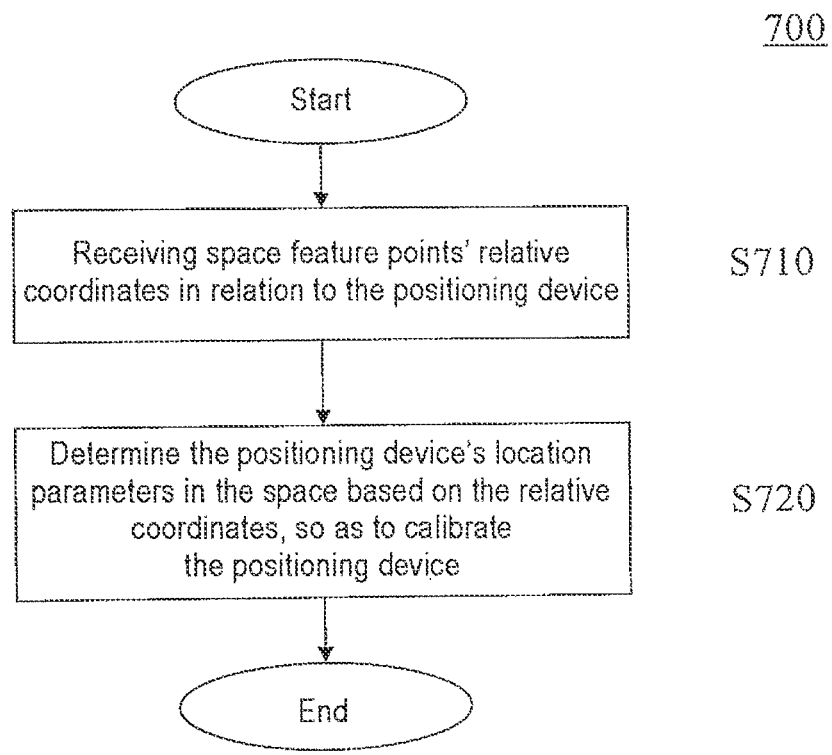
Figure 19:
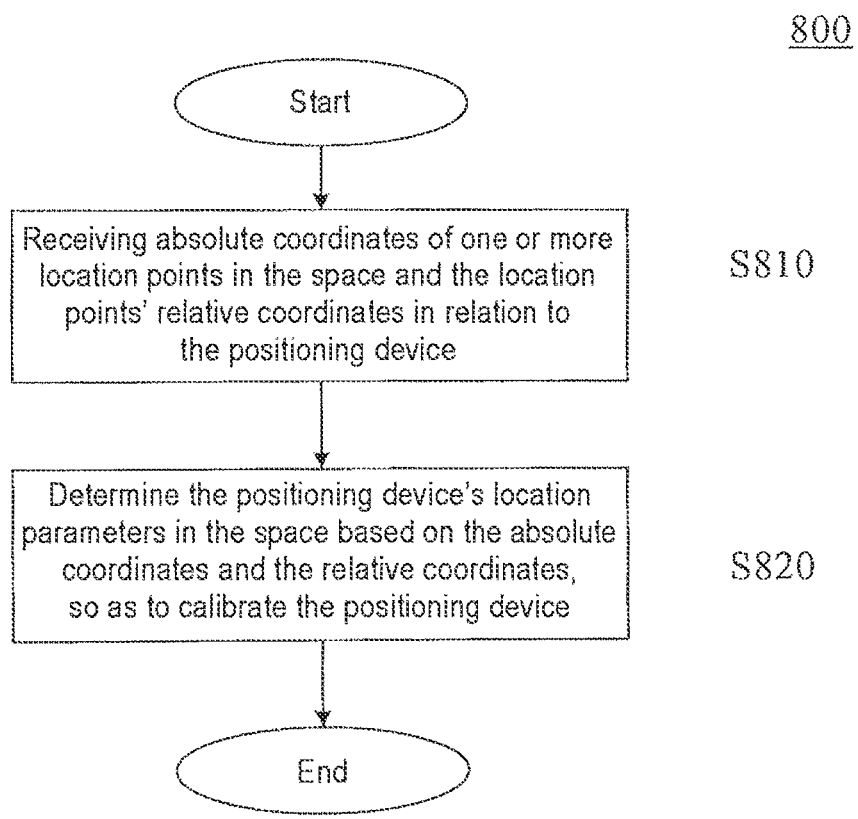
Figure 20:
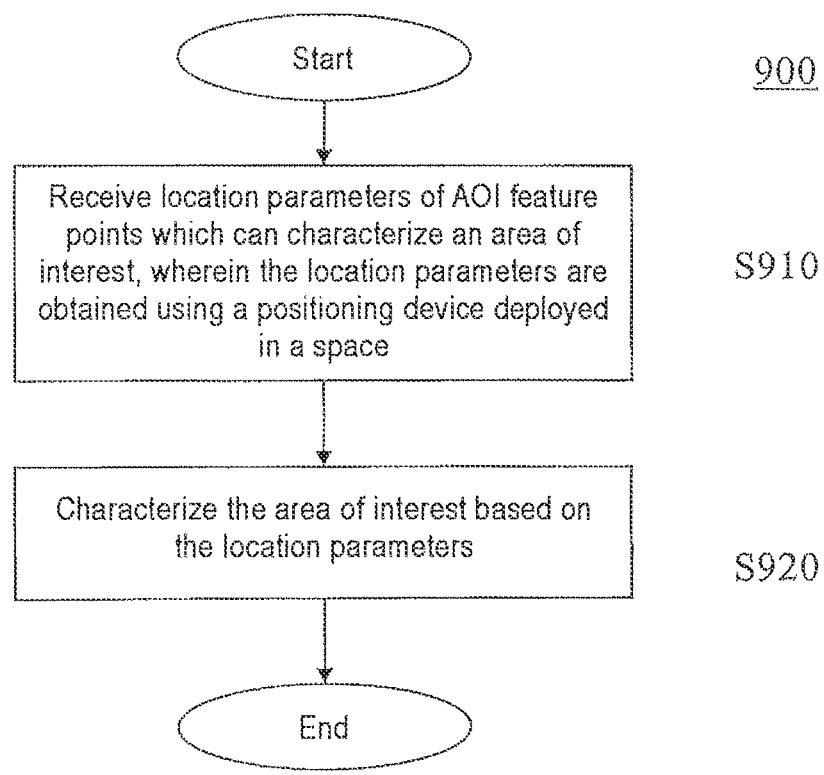

FIGS. 15a and 15b each depict a schematic view of the grouping process according to an embodiment of the present invention;

FIG. 16 depicts an example of fitting an irregularly-shaped feature area as a quadrangle according to an embodiment of the present invention;

FIG. 17 depicts a block diagram of a device according to another embodiment of the present invention;

FIG. 18 depicts a flowchart of a method according to an embodiment of the present invention;

FIG. 19 depicts a flowchart of a method according to another embodiment of the present invention; and FIG. 20 depicts a flowchart of a method according to a further embodiment of the present invention.

DESCRIPTION OF THE PREFERRED EMBODIMENTS

Figure 1:
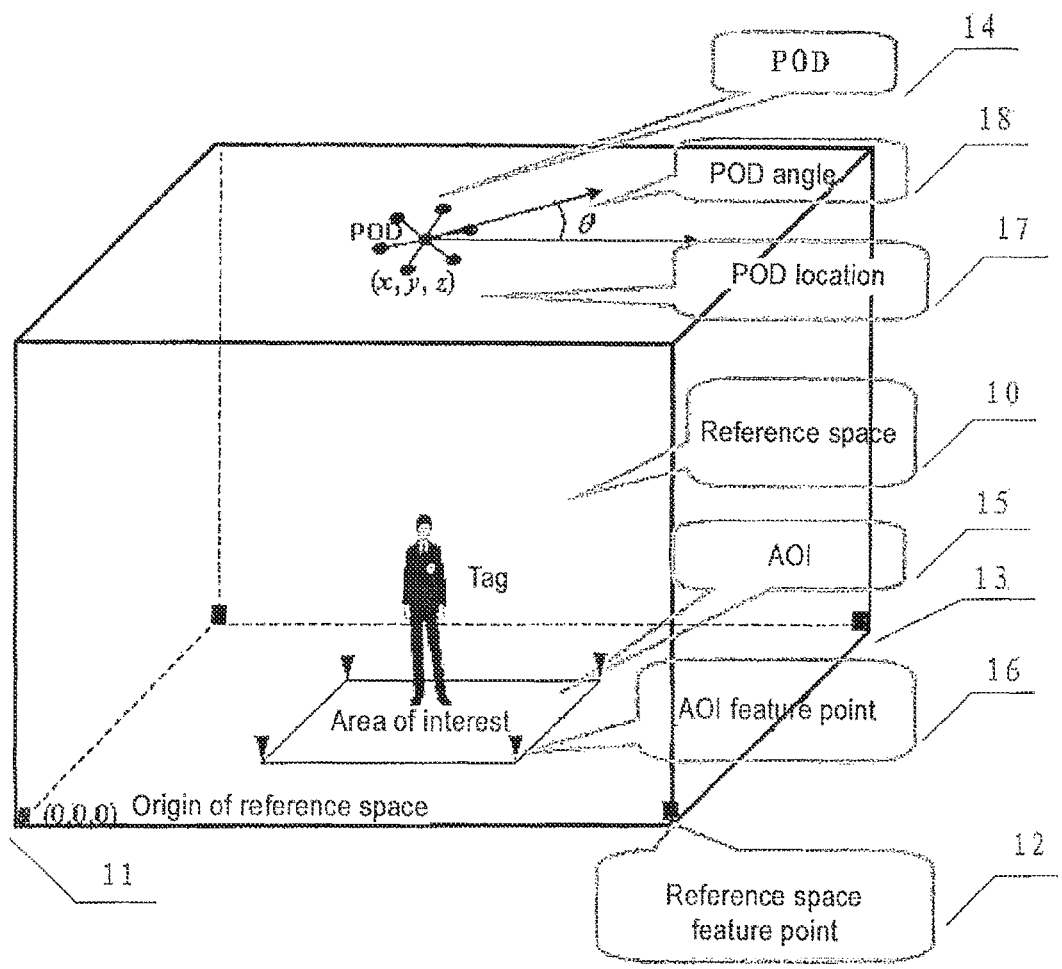
FIG. 1 depicts a schematic view of a space in which the present invention is implemented and which uses a room as an example.
Figure 2:
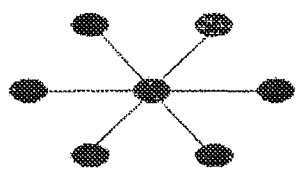
FIG. 2 depicts a schematic view of a positioning device according to an embodiment of the present invention.

Referring to FIGS. 1 and 2, a brief explanation is first given to the terms mentioned in the embodiments of the present invention.

1. Space

The Space according to the embodiment of the present invention means a space in which an object moves, such as a room, office, and meeting room. FIG. 1 depicts a schematic view of a reference space 10 using a room as an example. It is to be understood that the embodiment of the present invention is not limited to a quadrangular room as depicted in FIG. 1, and the room may be in any shape. To learn the location of an object in a space, the size of the space must be known. According to an embodiment of the present invention, there is provided a technical solution for determining the size of a space, which will be described below in detail.

2. Space Feature Point

The space feature point is a location point for determining a space. For example, in space 10 which is a room as an example in FIG. 1, space feature points may be room corner location points 11, 12, and 13. In principle, any point within the space can be selected as a space feature point as long as this point can be used to determine the space. It is to be understood that when the room is in other polygonal shape, e.g., a hexagonal shape, vertices of the polygon can be used as feature points. If the room is in other irregular shape, then at least three points on the boundary of the room are used to fit a polygon, so that the room in other shape can be treated like a polygonal room.

3. Positioning on One Device (POD)

The POD according to the embodiment of the present invention is a device for determining the coordinates of a location point in a space. FIG. 2 depicts an example of the POD used in the embodiment of the present invention. As depicted in FIG. 2, the POD used in the embodiment of the present invention is a sensor array having a plurality of leaf nodes. The number of leaf nodes is at least two. In other words, the POD comprises at least two leaf node sensors and one sensor located between the at least two leaf node sensors. Typically, the more leaf nodes, the higher positioning accuracy. The POD depicted in FIG. 2 has six leaf nodes. In a practical application as depicted in FIG. 1, POD 14 is usually deployed on the ceiling of space 10, which can emit ranging signals to an object location point in space 10 or receive ranging signals from an object location point in space 10.

Only a receiving function of the POD is used in the embodiment of the present invention. However, the POD may have a calculation function for performing relevant calculation according to received ranging signals. Or the POD can be connected to a remote server or a dedicated computer device in a wired or wireless fashion, so that it can perform calculation based on ranging signals at the remote server or dedicated computer device. Usually, it is possible to obtain the coordinates of an object location point in a space using a conventional triangulation or coordination transformation based on ranging signals received from the object location point by the POD. As the structure and function of the POD are well known in the art, details thereof are omitted.

4. Absolute Coordinate System

A coordination system where a location point in a space is used as the origin of coordinates is termed an absolute coordinate system in the embodiment of the present invention. Any feature point in the space can be used as the origin of the absolute coordinate system. For example, a feature point 11 is used as the origin of the absolute coordinate system in space 10 depicted in FIG. 1. Of course, those skilled in the art would appreciate that selecting one of feature points as the origin merely facilitates calculation but is not essential. If other location point is selected as the origin of coordinates, the above-discussed absolute coordinate system can be obtained through simple coordinate translation. This is quite familiar to those skilled in the art, so a detailed description thereof is omitted.

5. Relative Coordinate System

A coordinate system where the POD is used as the origin is termed a relative coordinate system in the embodiment of the present invention. The origin of the relative coordinate system is the center point of the POD, and the X-axis direction is the first sensor (not depicted) of the POD. Here, the so-called "first sensor" may be specified during initial configuration for the manufacture of the POD. When the X-axis is specified, a direction perpendicular to the X-axis and located in the plane of the POD is defined as the Y-axis.

When the POD is calibrated, an included angle 0 might be formed between the relative coordinate system and the absolute coordinate system. In the present invention, this included angle is termed a setting angle of the POD in the absolute coordinate system, i.e., a POD angle 18 as depicted in FIG. 1. Hence, location parameters of the location (a POD location 17 as depicted in FIG. 1) of the POD in the space comprise the absolute coordinates under the absolute coordinate system and the setting angle θ of the POD. According to an embodiment of the present invention, there is a provided a technical solution for calibrating a positioning device in a space, which will be described below in detail.

6. Tag

In the embodiment of the present invention, the tag means a tag capable of emitting ranging signals, such as an RF tag. It may be placed at a location point in a space, so that the relative coordinates or absolute coordinates of the location point can be obtained by receiving ranging signals emitted from the tag by the POD. There may be various types of ranging signal, including, without limitation to, ultrasonic waves, infrared, lasers, RF signals, ultra-broadband pulse signals, Doppler signals, and sound waves. As determining of the relative coordinates or absolute coordinates of the location point by the POD and tag is well known in the art, details thereof is omitted.

7. Area of Interest (AOI) and AOI Feature Point

The Area of Interest means a geographical area characterized by a user for some specific application requirements (such as for security purposes). The Area of Interest is located in a space. For example, in "Secure Table" application, the table is defined as the Area of Interest. Only within the Area of Interest, access to confidential information is allowed; beyond or out of the Area of Interest, any access to the confidential information is prohibited. The AOI feature points refer to location points that can be used for characterizing the Area of Interest. FIG. 1 depicts the Area of Interest 15 and an AOI feature point 16. According to an embodiment of the present invention, there is provided a technical solution for characterizing the Area of Interest in a space, which will be described below in detail.

Each embodiment of the present invention will be described with reference to the figures. It is to be understood that these embodiments are merely illustrative and not limiting.

Figure 3:
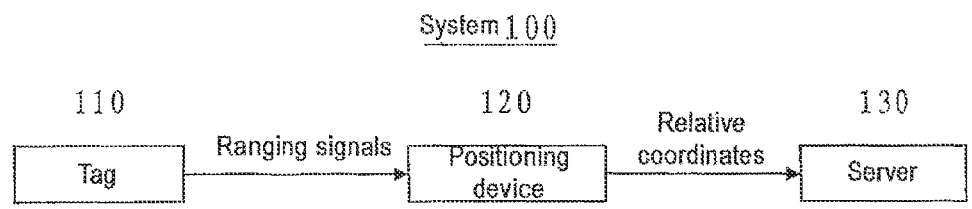
FIG. 3 depicts a block diagram of a system according to an embodiment of the present invention.

Description is first given to a technical solution for calibrating a positioning device according to an embodiment of the present invention. FIG. 3 depicts a schematic view of a system 100 according to an embodiment of the present invention, which system is used for measuring the size of a space and calibrating a positioning device in the space.

As depicted in FIG. 1, system 100 may comprise: a tag 110 capable of emitting ranging signals and placed at one or more location points in the space which serve as space feature points; a positioning device 120 located in the space and configured to obtain relative coordinates of the space feature points in relation to the positioning device based on the ranging signals from the tag; and a server 130 configured to determine location parameters of positioning device 120 in the space based on the obtained relative coordinates, so as to calibrate the positioning device 120.

A detailed description will be given below to the implementation of system 100. Specifically, according to an embodiment of the present invention, three space feature points (depicted as reference space feature points in FIG. 1) in the space are selected, and tag 110 capable of emitting ranging signals is placed at these feature points so as to determine the three space feature points' relative coordinates in relation to the positioning device. In an embodiment of the present invention, an individual tag is placed at each space feature points to determine these space feature points' relative coordinates. Alternatively, one tag is successively placed at the selected space feature points to determine these space feature points' relative coordinates. As tag 110 is well known in the art, details thereof are omitted.

Then, positioning device 120 is deployed in the space, and the positioning device 120 may be deployed at any place of the space. Alternatively, positioning device 120 is deployed on the ceiling of the space. The initial deployment is arbitrary, i.e., the positioning device may be deployed at any place of the ceiling. Next, positioning device 120 obtains these space feature points' relative coordinates in relation to itself based on the ranging signals from tag 110.

For example, in an embodiment of the present invention, positioning device 120 determines three sensors' relative coordinates in relation to itself by taking its center as the origin of coordinates. Then, the three sensors obtain their respective distances to each space feature point based on the ranging signals from tag 110 at the space feature points. And lastly, the relative coordinates of each space feature point in relation to positioning device 120 are obtained according to a traditional triangulation algorithm (e.g., the Least Mean Square Error algorithm) by using the respective distances from the space feature points to each sensor and the relative coordinates of each sensor. As obtaining of the relative coordinates of each space feature point in relation to positioning device 120 by the traditional triangulation algorithm is well known in the art, details thereof are omitted.

According to the embodiment of the present invention, server 130 automatically calculates location parameters of positioning device 120 in the space, so as to automatically calibrate positioning device 120. This will be described in detail. Alternatively, the location parameters comprise the absolute coordinates (x, y, z) and the setting angle θ of positioning device 120 in the space. This will also be described in detail.

It is not necessary that tag 110 and positioning device 120 are placed sequentially. They may be placed at the same time, or positioning device 120 may be placed first, and then tag 110 is placed at space feature points.

Figure 4:
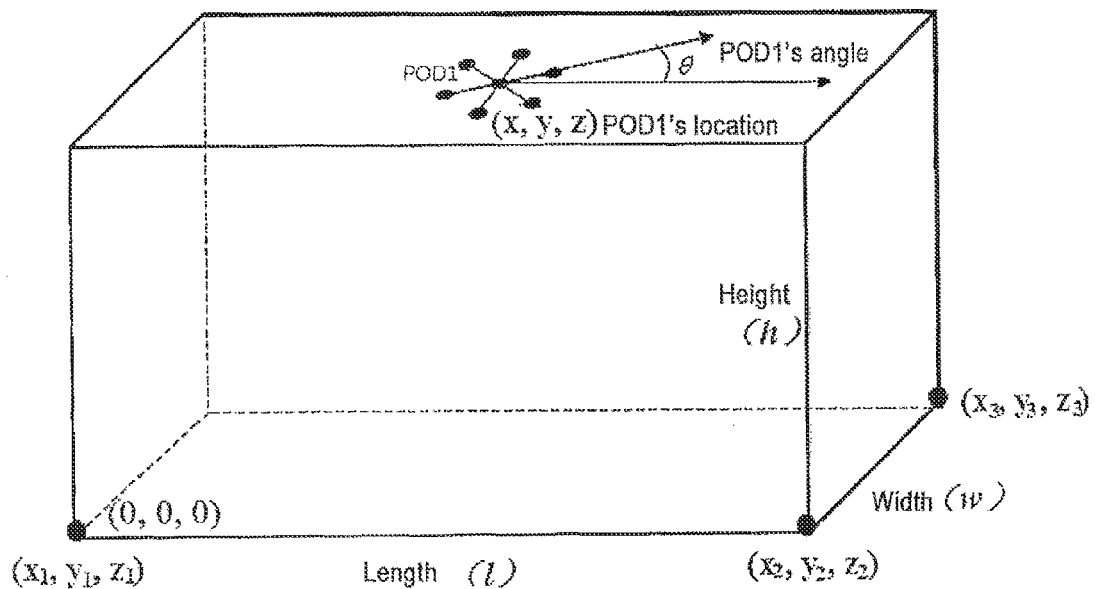
FIG. 4 depicts a three-dimensional schematic view of a reference space according to an embodiment of the present invention.
Figure 5:
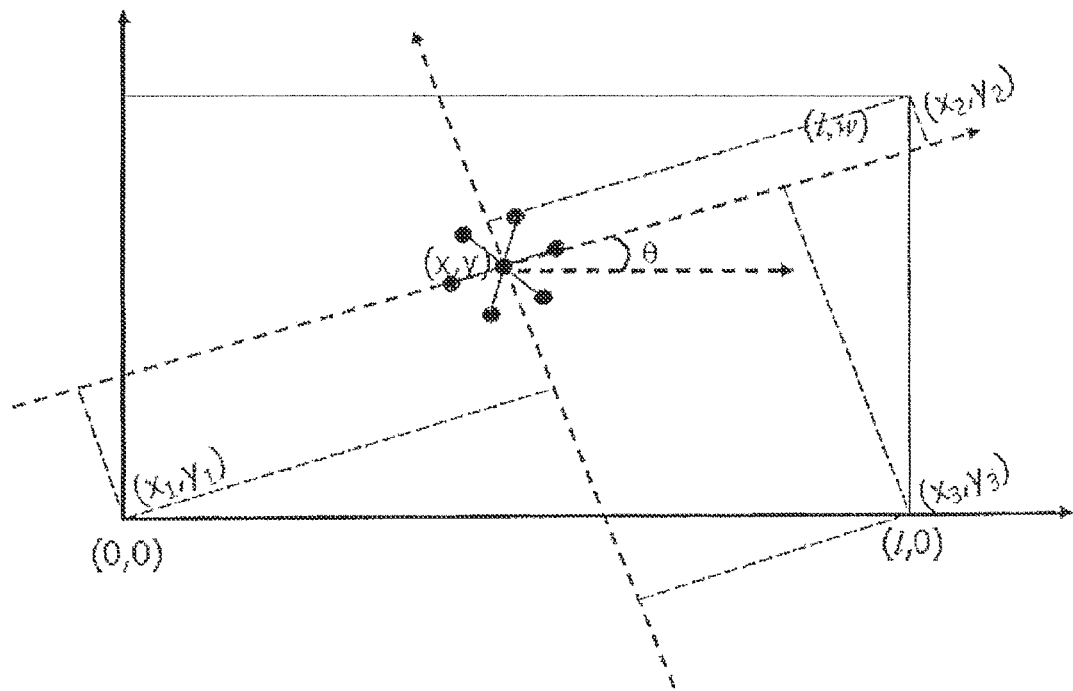
FIG. 5 depicts a simplified two-dimensional view of a reference space according to an embodiment of the present invention.

Referring to FIGS. 4 and 5, description is given regarding how the server determines location parameters of positioning device 120 in the space based on the obtained relative coordinates of three reference space feature points in the context of a quadrangular room.

First of all, the size of the room (i.e., the reference space) is calculated.

As depicted in FIG. 4, the respective relative coordinates of three reference space feature points on the ground are set as $(x_1, y_1, z_1)$, $(x_2, y_2, z_2)$, $(x_3, y_3, z_3)$, which relative coordinates have been learned using positioning device 120 and tag 110. The feature point $(x_1, y_1, z_1)$ is defined as the origin of absolute coordinate system (0, 0, 0) in the reference space. The room's length (l), width (w), and height (h), positioning device's 120 absolute coordinates (x, y, z) as well as the POD's setting angle θ are unknowns.

First, positioning device 120's z-coordinate, i.e., the positioning device's height (h), is determined. As the ceiling is typically parallel to the ground, positioning device 120's height is h, i.e., $z=h=z_1=z_2=z_3$. However, considering possible error, e.g., error caused by unevenness of the ground, the z-coordinate is determined $z=h=(z_1+z_2+z_3)/3$.

After z is determined, the other unknowns are to be solved in the two-dimensional space.

FIG. 5 depicts a schematic view of how to calculate the unknown values (e.g., the room's length (l), width (w), and height (h), the POD's absolute coordinates (x, y) and setting angle θ) in the two-dimensional space according to an embodiment of the present invention.

As depicted in FIG. 5, a coordinate system represented by solid lines is the absolute coordinate system in the present invention, and a coordinate system represented by dashed lines is the relative coordinate system where the positioning device serves as the origin. The included angle between the two coordinate systems, i.e., the setting angle of the positioning device, is θ.

According to FIG. 5, equation group (1) is obtained through conventional coordinate transformation.

$$x_1 \cos(\theta) - y_1 \sin(\theta) + x = 0$$

$$x_1 \sin(\theta) + y_1 \cos(\theta) + y = 0$$

$$x_2 \cos(\theta) - y_2 \sin(\theta) + x = l$$

$$x_2 \sin(\theta) + y_2 \cos(\theta) + y = w$$

$$x_3 \cos(\theta) - y_3 \sin(\theta) + x = l$$

$$x_3 \sin(\theta) - y_3 \cos(\theta) + y = 0$$

$$(x_1 - x_3)^2 + (y_1 - y_3)^2 = l^2$$

$$(x_2 - x_3)^2 + (y_2 - y_3)^2 = w^2 \quad (1)$$

Those skilled in the art would appreciate that using more reference space feature points will increase the number of equations in equation group (1), i.e., the rows of the coefficient matrix. This is well known to those skilled in the art, so details thereof are omitted.

The positioning device's absolute coordinates (x, y) and angle θ, the reference space's length l and width w are derived by solving equation group (1). The calculation process is as below:

$$l = \sqrt{(x_1 - x_3)^2 + (y_1 - y_3)^2} \quad (2)$$

$$w = \sqrt{(x_2 - x_3)^2 + (y_2 - y_3)^2} \quad (3)$$

-continued $$x = (x_1^2 + y_1^2 - x_1 x_3 - y_1 y_3)/l \quad (4)$$

$$y = x_3^2 + y_3^2 - x_2 x_3 - y_2 y_3 / w \quad (5)$$

$$\theta = \operatorname{acsin}\left(\frac{y_3 x - x_1 y}{x_1 x_3 + y_3 y_1}\right) \quad (6)$$

In this way, the reference space's size and the positioning device's location parameters in the reference space, e.g., the positioning device's absolute coordinates (x, y, z) and setting angle θ, are obtained, so that determining of the space's size and calibrating of the positioning device are completed.

It is note that, once calibrated, the positioning device 120 can directly obtain absolute coordinates of any point in the space using the existing triangulation algorithm. In addition, positioning device 120 can obtain absolute coordinates of any point in the space through transformation from relative coordinates into absolute coordinates. That is, relative coordinates of a location point in relation to the positioning device in the space is obtained, and then the location point's absolute coordinates are obtained through conventional coordinate transformation.

The process of calibrating the positioning device according to the embodiment of the present invention has been described by selecting three space feature points in the foregoing example. However, the present invention is not limited to the implementation by three space feature points. In a specific implementation, only one or two space feature points can be used for calibrating the positioning device. For example, when the positioning device is deployed on the ceiling of the room, the X-axis (e.g., the direction of the first sensor) of its own relative coordinate system is made parallel to the X-axis of the space's absolute coordinate system. In this case, the positioning device's setting angle θ is actually zero. At this point, one of the room's corners is the origin of the absolute coordinate system, i.e., absolute coordinates of this corner are (0, 0, 0). This corner's relative coordinates in relation to the positioning device can be obtained by the positioning device. As discussed above, the positioning device's Z-coordinate is equal to the Z-coordinate value of the corner's relative coordinates in relation to the positioning device. In the two-dimensional plane, the positioning device's absolute X-coordinate and Y-coordinate are obtained through ordinary coordinate system translational transformation based on the corner's relative and absolute coordinates. As the transformation is well known in the art, details thereof are omitted.

It is to be understood that according to the embodiment of the present invention, the more space feature points are selected, the more equations are obtained through coordinate transformation, and the more accurate the positioning device's location parameters are determined as such.

The foregoing embodiment describes the process of calibrating the positioning device in a quadrangular room. However, it is to be understood that the present invention is not limited to a quadrangular space. If the space is in an irregular shape, a polygon can be fit using three points on the boundary of the space, so that the space in an irregular shape can be treated like a polygonal space.

Figure 6:
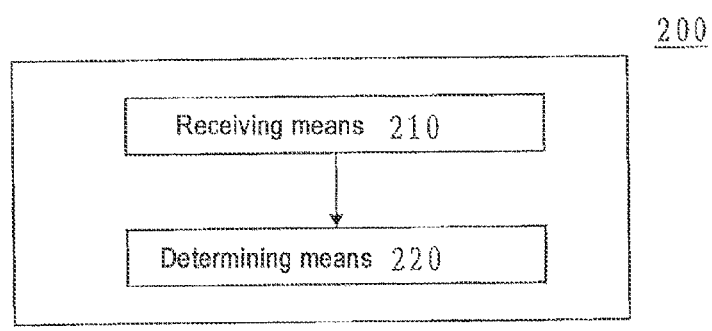
FIG. 6 depicts a block diagram of a device according to an embodiment of the present invention.

As depicted in FIG. 6, according to another embodiment of the present invention, there is also provided a device 200 for calibrating a positioning device in a space where one or more location points are selected as space feature points. Device 200 may comprise: receiving means 210 for receiving relative coordinates of the space feature points in relation to the positioning device; and determining means 220 for determining location parameters of the positioning device in the space based on the relative coordinates, so as to calibrate the positioning device. The operating process of determining means 220 is the same as the process of determining the positioning device's location parameters in the space based on relative coordinates in the embodiment as described in conjunction with FIG. 3.

According to the embodiment of the present invention, a tag capable of emitting ranging signals can be placed at the space feature point. Relative coordinates can be obtained by the positioning device based on ranging signals from the tag. This is the same as the operating process of positioning device 120 in FIG. 3.

It is to be understood that in practical applications, device 200 can be integrated on the positioning device 120 depicted in FIG. 3 or on server 130 connected to the positioning device 120 as depicted in FIG. 3.

Figure 7:
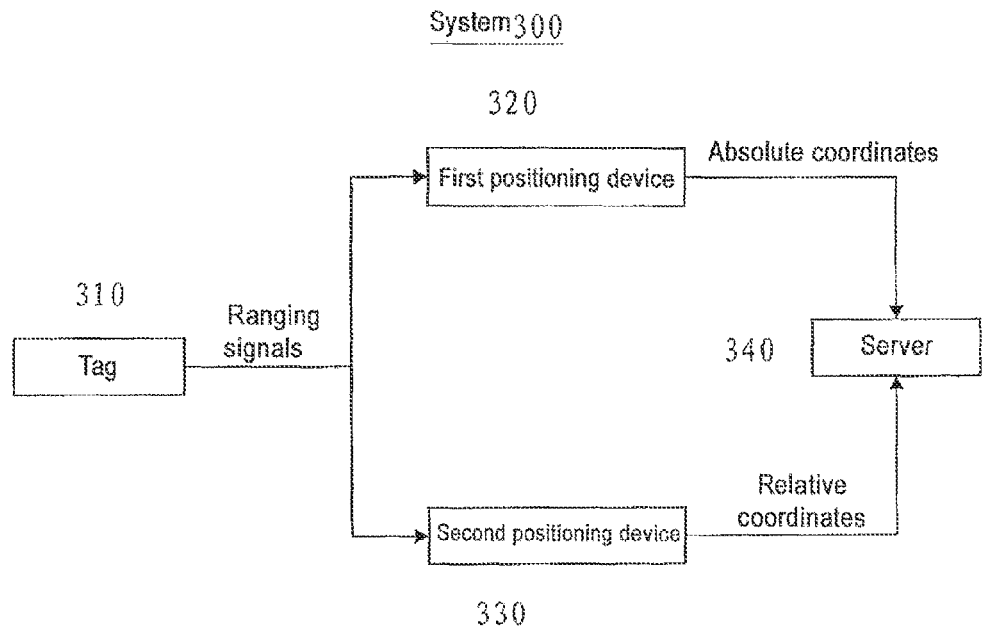
FIG. 7 depicts a block diagram of a system according to another embodiment of the present invention.

Description will be given below to the technical solution for calibrating a positioning device according to another embodiment of the present invention. Usually, multiple positioning devices can be deployed in a large room so as to cover the whole room. As depicted in FIG. 7, according to another embodiment of the present invention, there is provided a system 300 for calibrating multiple positioning devices. System 300 may comprise: a tag 310 capable of emitting ranging signals and placed at one or more location points in the space; a calibrated first positioning device 310 configured to obtain the location point's absolute coordinates in the space based on ranging signals from tag 310; a second positioning device 330 configured to obtain the location points' relative coordinates in relation to itself based on ranging signals from tag 310; and a server 340 configured to determining second positioning device 330's location parameters in the space based on the absolute coordinates and relative coordinates, so as to calibrate second positioning device 330, wherein the location points are located in an overlapped coverage area between first positioning device 320 and second positioning device 330.

Description is given below to concrete implementation of system 300 with reference to FIG. 8. To facilitate description, first positioning device 320, which has been calibrated in the space is denoted as POD1, and second positioning device 330, which is to be calibrated, is denoted as POD2 in the figure.

Figure 8:
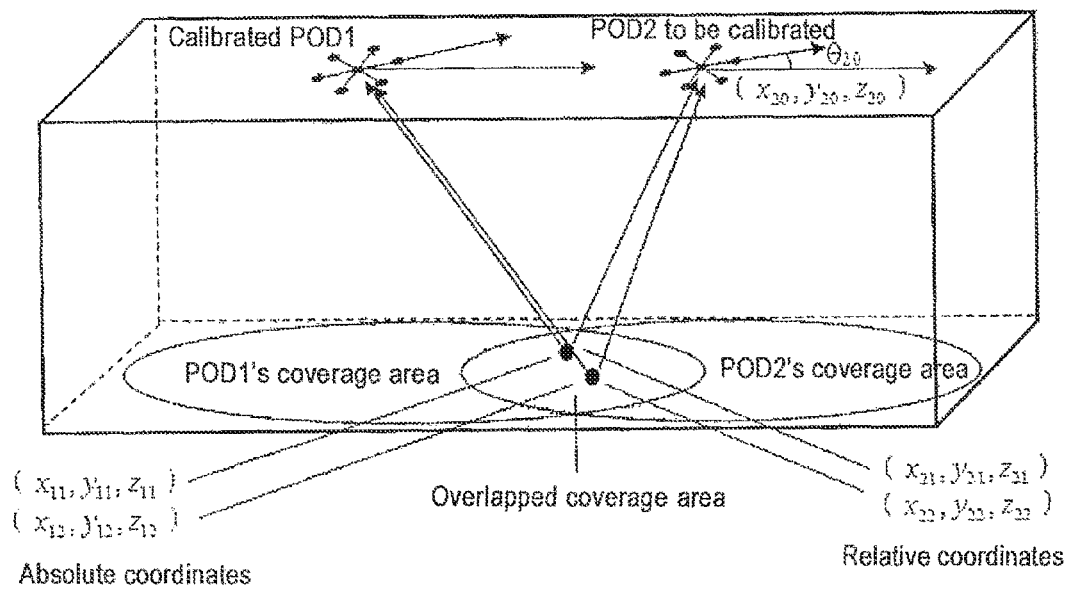
FIG. 8 depicts a spatial schematic view of a method for calibrating a positioning device based on a calibrated positioning device according to an embodiment of the present invention.

In FIG. 8, POD1 has been calibrated. It should be noted, however, that the calibration of POD1 can be implemented either by the technical solution according to FIGS. 3-6 or by other suitable methods.

In order to calibrate POD2, first, the respective coverage areas of POD1 and POD2 should be determined, and it should be ensured that POD1 and POD2 have an overlapped coverage area. As depicted in FIG. 8, the coverage area of POD1 is called the first coverage area, POD2 has the second coverage area, and POD1 and POD2 have an overlapped coverage area. Various methods can be used to determine the overlapped coverage area. For example, it is possible to determine whether a specific location is located within the overlapped coverage area, by checking whether POD1 and POD2 can simultaneously detect a tag placed at the location. Other methods can also be used to determine the overlapped coverage area.

Then, to calibrate POD2, the POD2's absolute coordinates $(x_{20}, y_{20}, z_{20})$ in the room and POD2's angle $\theta_{20}$ should be calculated. Specifically, two location points (referred to as overlapped coverage area location points for the purpose of convenient description) within the overlapped coverage area are selected, and a tag (referred to as overlapped coverage area tag for the same purpose) is placed at each of the location points so as to emit ranging signals (referred to as overlapped coverage area ranging signals for the same purpose). Alternatively, one tag is successively placed at at least two location points to emit ranging signals.

According to an embodiment, POD1 can first obtain these two overlapped coverage area location points' relative coordinates in relation to itself based on ranging signals from the overlapped coverage area tag and then obtain these two overlapped coverage area location points' absolute coordinates through coordinate transformation, e.g., $(x_{11}, y_{11}, z_{11})$ and $(x_{12}m, y_{12}, z_{12})$. Alternatively, POD1 can directly obtain these two overlapped coverage area location points' absolute coordinates $(x_{11}, y_{11}, z_{11})$ and $(x_{12}, y_{12}, z_{12})$ by the existing triangulation algorithm based on ranging signals from the tag.

At the same time, POD2 can obtain these two overlapped coverage area location points' absolute coordinates $(x_{21}, y_{21}, z_{21})$ and $(x_{22}, y_{22}, z_{22})$ in its own coordinate system. Since POD1 has been calibrated, these two overlapped coverage area location points' absolute coordinates are known. In addition, since POD2 is deployed on the ceiling for example, POD2's $z_{20}=h=(z1+z2+z3)/3$. In this way, the calculation of POD2's coordinates $(x_{20}, y_{20}, z_{20})$ and angle $\theta_{20}$ is simplified to be performed in the two-dimensional coordinate.

POD2's absolute coordinates in the reference space can be calculated by the following equation group through geometric analysis:

$$\begin{cases} x_{21}\cos(\theta_{20}) - y_{21}\sin(\theta_{20}) + x_{20} = x_{11} \\ x_{21}\sin(\theta_{20}) + y_{21}\cos(\theta_{20}) + y_{20} = y_{11} \\ x_{22}\cos(\theta_{20}) - y_{22}\sin(\theta_{20}) + x_{20} = x_{12} \\ x_{22}\sin(\theta_{20}) + y_{22}\cos(\theta_{20}) + y_{20} = y_{12} \end{cases} \quad (7)$$

The following matrix calculation can be derived by equation group (7):

$$\begin{bmatrix} x_{21} & -y_{21} & 1 & 0 \\ y_{21} & x_{21} & 0 & 1 \\ x_{22} & -y_{22} & 1 & 0 \\ y_{22} & x_{22} & 0 & 1 \end{bmatrix} \begin{bmatrix} \cos(\theta_{20}) \\ \sin(\theta_{20}) \\ x_{20} \\ y_{20} \end{bmatrix} = \begin{bmatrix} x_{11} \\ y_{11} \\ x_{12} \\ y_{12} \end{bmatrix} \quad (8)$$

By solving the matrix, the second positioning device's coordinates and angle $\theta_{20}$ can be obtained:

$$\begin{bmatrix} \cos(\theta_{20}) \\ \sin(\theta_{20}) \\ x_{20} \\ y_{20} \end{bmatrix} = (A^T A)^{-1} A^T b \quad (9)$$

in which $$A = \begin{bmatrix} x_{21} & -y_{21} & 1 & 0 \\ y_{21} & x_{21} & 0 & 1 \\ x_{22} & -y_{22} & 1 & 0 \\ y_{22} & x_{22} & 0 & 1 \end{bmatrix}, b = \begin{bmatrix} x_{11} \\ y_{11} \\ x_{12} \\ y_{12} \end{bmatrix}$$

Thus, the absolute coordinates and angle of POD2, which is to be calibrated, are determined.

The process of calibrating the positioning device according to the embodiment of the present invention has been described by selecting two overlapped coverage area location points in the foregoing example. However, the present invention is not limited to two overlapped coverage area location points. In a specific implementation, only one overlapped coverage area location point can be used for calibrating the positioning device. For example, if the first positioning device has been calibrated and the second positioning device is to be calibrated, the second positioning device's X-axis can be set to be parallel to the first positioning device's X-axis. In this case, the second positioning device's setting angle is the same as the first positioning device's setting angle, which is a known. At this point, an overlapped coverage area location point's absolute coordinates are obtained by the calibrated first positioning device, and the location point's relative coordinates in relation to the second positioning device are obtained by the second positioning device. Next, the second positioning device's absolute coordinates can be obtained through ordinary coordinate transformation.

It should be noted that more than two overlapped coverage area location points can be selected. This will increase the number of rows of the foregoing coefficient matrix, whereas the calculation process is the same as the foregoing calculation process. It is to be understood that selecting more overlapped coverage area location points helps to increase the positioning accuracy.

Further, more PODs can be gradually calibrated based on the calibrated POD using the foregoing method, so that a larger area is covered. Details are omitted here.

Figure 9:
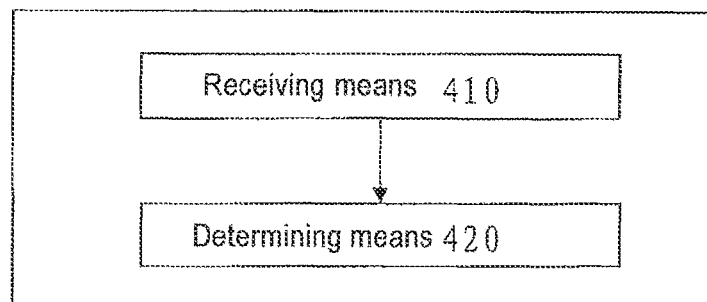
FIG. 9 depicts a block diagram of a device according to another embodiment of the present invention.

As depicted in FIG. 9, according to an embodiment of the present invention, there is provided a device 400 for calibrating a positioning device (e.g., POD2). Device 400 may comprise: receiving means 410 for receiving one or more location points' absolute coordinates in a space and their relative coordinates in relation to the positioning device; and determining means 420 for determining the positioning device's location parameters in the space based on the absolute coordinates and relative coordinates, so as to calibrate the positioning device. The operating process of determining means 420 is the same as the process of determining the positioning device's location parameters in the space based on absolute coordinates and relative coordinates in the embodiment as described with reference to FIGS. 7 and 8.

It is to be understood that the location points' absolute coordinates in the space can be obtained in any known manner. Alternatively, the at least two location points' absolute coordinates are determined by another positioning device (e.g., POD1) that has been calibrated, according to the embodiment of the present invention. The at least two location points are located in an overlapped coverage area between the positioning device and the calibrated another positioning device, a tag capable of emitting ranging signals is placed at the at least two location points, the positioning device can obtain the relative coordinates based on ranging signals from the tag, and the another positioning device can obtain the absolute coordinates based on ranging signals from the tag. Of course, the location points' absolute coordinates in the space can also be determined manually.

It should be noted that device 400 can be integrated in the first positioning device 320 or second positioning device 330 (e.g., POD2) or server 340 depicted in FIG. 7.

Description has been given above to a method of calibrating a positioning device according to an embodiment of the present invention. It is plain that no manual measurement of the room's length, width as well as the positioning device's setting angle is involved when the positioning device is being calibrated. Furthermore, manual measurement is avoided by using tags, so that the working efficiency is increased and the calibration accuracy improved.

Description will be given below to a technical solution for characterizing an area of interest after determining a reference space and calibrating a positioning device according to an embodiment of the present invention. Referring back to FIG. 1, an area of interest is shown in this figure. The area of interest may be any placed within the space, or an area in an arbitrary shape may be selected as an area of interest. When a person wearing a tag enters this area of interest, the person's relationship with the space is determined according to requirements, such as permitting/prohibiting the person's access to specific confidential information. To achieve this purpose, it is necessary to determine the boundary of the area of interest, i.e., characterize the area of interest.

It should be noted the space where the area of interest is located is not necessarily a reference space determined according to the embodiment in FIGS. 3-6 of the present invention but may be a space determined according to any prior art including manual measurement without a tag. A positioning device that determines the area of interest is not necessarily the positioning device depicted in FIG. 2 but may be any known positioning device or positioning device array.

Figure 10:
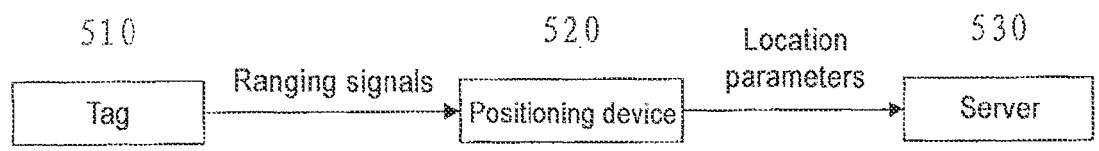
FIG. 10 depicts a block diagram of a system according to another embodiment of the present invention.

As depicted in FIG. 10, according to an embodiment of the present invention, there is provided a system 500 for determining or characterizing an area of interest. System 500 may comprise: a tag 510 capable of emitting ranging signals and placed at AOI feature points that can characterize an area of interest in a space; a positioning device 520 in the space, which is configured to obtain location parameters of the AOI feature points based on ranging signals from tag 510; and a server 530 configured to characterize the area of interest based on the location parameters of the AOI feature points.

If the area of interest is located in the determined space, it can employ the same reference coordinates as the reference space. In other words, absolute coordinates of any point within the area of interest references a certain point (e.g., a corner of a room) within the reference space as the origin.

Shapes of areas of interest can be classified as two categories, namely regular shapes and irregular shapes. Respective descriptions will be given below to technical solutions for determining a regularly-shaped area of interest and for determining an irregularly-shaped area of interest according to the present invention. It should be noted here that since preferably the area of interest is parallel to the horizontal plane, the height of the area of interest may be the height of any selected AOI feature point. To prevent the occurrence of positioning error, however, the average of the heights of these areas of interest is selected. Once the height of the area of interest is selected, what is left is to determine the shape of the area of interest in the two-dimensional coordinate. This is the same as averaging of the Z-coordinates of several feature points during determining the reference space. Hence, description of the Z-coordinate is omitted, but only a method of determining the area of interest in the two-dimensional coordinate is described.

Figure 11:
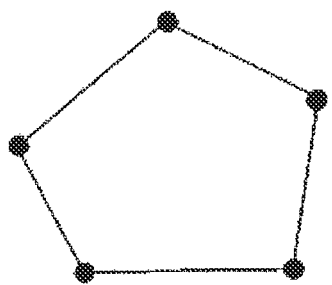
FIG. 11 depicts a schematic view of a method for characterizing a polygonal area of interest according to an embodiment of the present invention.

A detailed description is given now to the concrete implementation of system 500 depicted in FIG. 10, with reference to FIGS. 11-16. FIG. 11 depicts a schematic view of a method of characterizing a polygonal area of interest according to an embodiment of the present invention.

As depicted in FIG. 11, the polygon has five edges for example, so preferably the five vertices of the polygon are selected as AOI feature points. Tag 510 as depicted in FIG. 10 is placed at each vertex of the polygon, which tag can emit ranging signals to positioning device 520. Then, positioning device 520 receives the ranging signals and obtains from the ranging signals coordinates of the five AOI feature points in the space. Alternatively, relative coordinates of the five AOI feature points in relation to positioning device 520 are obtained first. Next, absolute coordinates of these AOI feature points in the reference space are obtained based on the relative coordinates and positioning device 520's location parameters in the space through traditional coordination transformation. In this way, it is possible to characterize the polygonal, e.g., pentagonal AOI based on the absolute coordinates. Specifically, these vertices are connected so as to determine the polygonal area of interest.

It is to be understood that the area of interest can also be characterized by using relative coordinates of the AOI feature points in relation to the positioning device.

Figure 12:
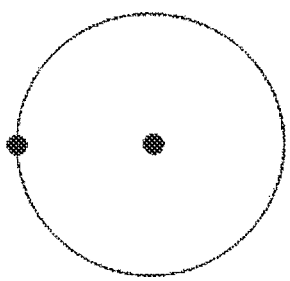
FIG. 12 depicts a schematic view of a method for characterizing a circular area of interest according to an embodiment of the present invention.

FIG. 12 depicts a schematic view of a method of characterizing a circular area of interest according to another embodiment of the present invention.

As depicted in FIG. 12, if the area of interest is a circle, feature points of the area of interest are preferably selected as the center point of the circle and an arbitrary point on the circle edge. Let the center point's two-dimensional absolute coordinates be $(x_1, y_1)$ and two-dimensional absolute coordinates of the arbitrary point on the circle edge be $(x_2, y_2)$, then the radius r of the circular area of interest is $$r=\sqrt{(x_1-x_2)^2+(y_1-y_2)^2} \tag{10}$$

According to equation (10), coordinates (x, y) of the arbitrary point within the circular area of interest can be determined as $$(x-x_1)^2+(y-y_1)^2 \le r^2 \tag{11}$$

Figure 13:
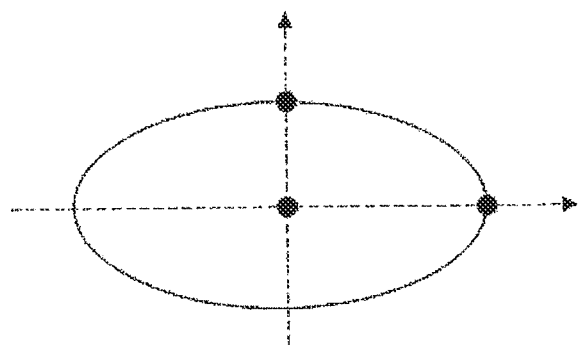
FIG. 13 depicts a schematic view of a method for characterizing an elliptic area of interest according to an embodiment of the present invention.

FIG. 13 depicts a method of characterizing an elliptic area of interest according to a further embodiment of the present invention.

As depicted in FIG. 13, if the area of interest is an ellipse, feature points of the area of interest are preferably selected as the center point of the ellipse, the cross point of the long axis with the ellipse, and the cross point of the short axis with the ellipse. Let two-dimensional absolute coordinates of the center point be $(x_1, y_1)$, two-dimensional coordinates of the cross point of the long axis with the ellipse be $(x_2, y_2)$, and two-dimensional coordinates of the cross point of the short axis with the ellipse be $(x_3, y_3)$, then the ellipse's long axis a and short axis b are $$a=\sqrt{(x_1-x_2)^2+(y_1-y_2)^2} \tag{12}$$

$$b=\sqrt{(x_1-x_3)^2+(y_1-y_3)^2} \tag{13}$$

According to equations (12) and (13), coordinates (x, y) of an arbitrary point within the elliptic area of interest can be determined as $$\frac{(x-x_1)^2}{a^2}+\frac{(y-y_1)^2}{b^2} \le 1 \tag{14}$$

Figure 14:
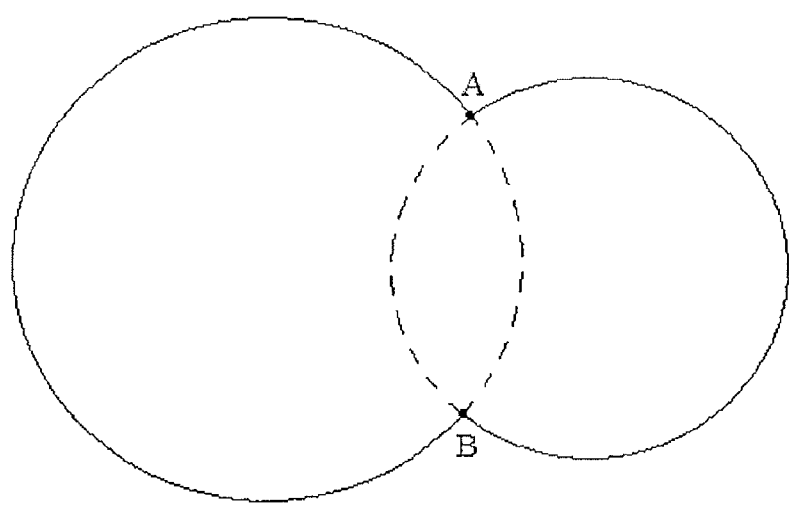
FIG. 14 depicts a schematic view of a method for characterizing a combination of two circles having different radiuses according to an embodiment of the present invention.

It should be noted that only several examples of irregular shape are given here. The present invention is not limited to the above-described polygon, circle, and ellipse but may include other shapes that can be expressed by more complex mathematical functions. In addition, the regular shape further means a combination of the above-noted basic regular shapes, such as a combination of circles and a combination of a circle and an ellipse. FIG. 14 depicts a combination of two circles having different radiuses. It is to be understood that those skilled in the art can determine the cross points A and B of these two circles according to equations (10) and (11), thereby determining an area of interest. The concrete calculation is quite obvious to those skilled in the art, so details thereof are omitted.

Description has been given above to examples of how to determine a regularly-shaped area of interest. Then, it is time to describe how to determine an irregularly-shaped area of interest.

Since any irregular shape can be approximated by a polygon. Description will be given below to how to fit an irregularly-shaped area of interest using a polygon.

First of all, it should be noted that "placing" tag 510 can be implemented in various ways. For example, multiple tags 510 can be simultaneously placed on the boundary of an irregularly-shaped area of interest, so that the positioning device can directly or indirectly obtain absolute coordinates or relative coordinates of AOI feature points where these tags are placed, based on these tags (i.e., through coordinate transformation). The more tags, the more accurate the shape of the area of interest. In addition, the following approaches can also be adopted: a user carries a tag and moves along the boundary of this irregularly-shaped area of interest. When the user is moving, the positioning device continuously receives signals from the tag, thereby obtaining a coordinate sequence of AOI feature points. Preferably, to increase quality of the coordinate sequence of AOI feature points, the user will stay at each feature point for a while until a result obtained by the positioning device becomes stable. The more feature points being collected, the higher accuracy of the determined irregularly-shaped area of interest. It should also be noted that to enhance accuracy, the height of the area of interest can be obtained by averaging heights of respective feature points.

According to the embodiment of the present invention, if the area of interest is in an irregular shape, at least three locations within the area of interest can be selected as AOI feature points to form a feature point sequence, and then the at least three AOI feature points are fit to characterize this area of interest.

It is clear that three AOI feature points can determine a plane. Hence, any shape can be roughly characterized using three points. Of course, the more selected AOI feature points, the more accurate characterization of the area of interest.

According to an embodiment of the present invention, fitting at least three AOI feature points comprises directly connecting the at least three AOI feature points one after another. It is to be understood that connecting feature points is actually a special fitting method.

According to another embodiment of the present invention, fitting at least three AOI feature points comprises grouping the feature point sequences and fitting the AOI feature points that are grouped into the same group.

Various methods may be used for grouping. For example, AOI feature points being obtained are grouped on average, or they are grouped by comparing their longitudinal coordinates or horizontal coordinates. For example, if some AOI feature points fluctuate slightly, for example, the difference in several horizontal coordinates (or longitudinal coordinates) is within a certain range, then these points can be grouped into the same group.

According to an embodiment of the present invention, a comparison is made as to whether an absolute value of a slope difference of lines determined by AOI feature points is less than a predetermined threshold. If the absolute value of the slope difference is less than a predetermined threshold, the AOI feature points are grouped into the same group, otherwise they are grouped into different groups.

FIGS. 15a and 15b depict in more detail the process of grouping according to an embodiment of the present invention.

As depicted in FIG. 15a, absolute coordinates of three consecutive AOI feature points are $(x_{i-2}, y_{i-2})$, $(x_{i-1}, y_{i-1})$, and $(x_i, y_i)$, in which i is an arbitrary integer. The slopes of lines determined by two adjacent points are $$\frac{x_i - x_{i-1}}{y_i - y_{i-1}} \text{ and } \frac{x_{i-1} - x_{i-2}}{y_{i-1} - y_{i-2}}.$$

According to the present embodiment, if the absolute value of the slope difference of lines determined by the three consecutive AOI feature points is less than a predetermined threshold, then the three AOI feature points are grouped into the same group, otherwise they are grouped into different groups. For example, if in equation (15) is met, then AOI feature points $(x_{i-1}, y_{i-1})$ and $(x_i, y_i)$ are grouped into the same group.

$$\left| \frac{x_i - x_{i-1}}{y_i - y_{i-1}} - \frac{x_{i-1} - x_{i-2}}{y_{i-1} - y_{i-2}} \right| < H \quad (15)$$

If in equation (16) is met, then AOI feature points $(x_{i-1}, y_{i-1})$ and $(x_i, y_i)$ are grouped into different groups:

$$\left| \frac{x_i - x_{i-1}}{y_i - y_{i-1}} - \frac{x_{i-1} - x_{i-2}}{y_{i-1} - y_{i-2}} \right| \geq H \quad (16)$$

in which H is a specific threshold that can be preset.

It should be noted that in equations (15) and (16) describe only one embodiment of grouping AOI feature points according to the present invention, in which the criterion for grouping is to continuously compare absolute values of slope differences of lines determined the three consecutive AOI feature points.

Description will be given below to another embodiment of grouping AOI feature points according to the present invention. According to the embodiment of the present invention, the slope of a line determined by first two AOI feature points is determined. Let coordinates of the first two AOI feature points be $(x_1, y_1)$ and $(x_2, y_2)$, then the determined line slop S is $$S = \frac{x_2 - x_1}{y_1 - y_1} \quad (17)$$

Next, the slope of a line determined by every two following adjacent points is compared with the slope S. If the absolute value of this difference is less than a specific threshold, then these points and $(x_1, y_1)$ and $(x_2, y_2)$ are grouped into the same group, as represented by in equation (18):

$$\left| \frac{x_i - x_{i-1}}{y_i - y_{i-1}} - S \right| < H \quad (18)$$

in which i represents the index of an AOI feature point.

Otherwise, if in equation (19) is not met, then these points and $(x_1, y_1)$ and $(x_2, y_2)$ are grouped into different groups:

$$\left|\frac{x_i - x_{i-1}}{y_i - y_{i-1}} - S\right| \geq H \tag{19}$$

In this way, multiple AOI feature points can be grouped into different groups. Moreover, the grouping method according to this embodiment can prevent accumulative error.

FIG. 15b depicts a schematic view of grouping multiple AOI feature points into four groups according to this embodiment, wherein 1, 2, 3, and 4 each represent the number of a group.

Description will be given below to line-fitting of respective AOI feature points after grouping according to an embodiment of the present invention, i.e., the process of one-order fitting.

After the respective AOI feature points are grouped, AOI feature points in each group are fit using a line, i.e., one-order line-fitting is performed on AOI feature points in each group. Let the line fitting the ith group is $$y = k_i x + z_i \tag{20}$$

in which $k_i$ is the line's slope, $z_i$ is the line's translation, and $k_i$ and $z_i$ can be calculated using two points' coordinates. Details thereof are omitted.

Vertices of the polygon formed by fitting can be determined as below: if i=1, then $$\begin{cases} V_{x,1} = \dfrac{z_N - z_1}{k_1 - k_N} \\ V_{y,1} = \dfrac{k_1 z_N - k_N z_1}{k_1 - k_N} \end{cases} \tag{21}$$

else $$\begin{cases} V_{x,i} = \dfrac{z_{i+1} - z_i}{k_i - k_{i+1}} \\ V_{y,i} = \dfrac{k_i z_{i+1} - k_{i+1} z_i}{k_i - k_{i+1}} \end{cases} \tag{22}$$

FIG. 16 depicts an example of an area of interest fit as a quadrangle in the foregoing embodiment. In this quadrangle, the positioning device can characterize the irregularly-shaped AOI simply through coordinates of four points $(V_{x,1}, V_{y,1})$, $(V_{x,2}, V_{y,2})$, $(V_{x,3}, V_{y,3})$, and $(V_{x,4}, V_{y,4})$.

According to another embodiment of the present invention, AOI feature points in each group can be fit using high-order curve-fitting method. For example, three-order curve-fitting equation can be expressed as $$y = a_0 + a_1 x + a_2 x^2 + a_3 x^3 \tag{23}$$

Values of coefficients $a_0$-$a_3$ can be solved with coordinates of four points. Thus, a feature area can be characterized more accurately through high-order curve-fitting at the expense of recording more feature points. Of course, the present invention is not limited to the fitting curve represented by equation (23) and can use other fitting curves. As curve fitting is quite familiar to those skilled in the art, details thereof are omitted.

Of course, the area of interest as depicted in FIG. 15b can be formed by directly connecting the obtained AOI feature points by a line. It should be noted that connecting respective points is actually a special case of the fitting process, which has been described above.

According to another embodiment of the present invention, there is provided a device 600 for characterizing an area of interest in a space, as shown in FIG. 17. Device 600 may comprise: receiving means 610 for receiving location parameters of AOI feature points capable of characterizing an area of interest, wherein the location parameters are obtained by a positioning device deployed in the space; characterizing means 620 for characterizing the area of interest based on the location parameters. The operating process of characterizing means 620 is the same as the process of characterizing the area of interest based on location parameters of AOI feature points, which has been described with reference to FIGS. 10-16.

According to an embodiment of the present invention, when the area of interest is in an irregular shape, receiving means 610 further receives location parameters of at least three AOI feature points on the boundary of the area of interest, so as to form a feature point sequence; characterizing means 620 further comprises means for fitting the feature point sequence to characterize the area of interest. Alternatively, the means for fitting the feature point sequence may comprise means for grouping the feature point sequences and means for fitting the AOI feature points which are grouped into the same group.

According to an embodiment of the present invention, the means for grouping the feature point sequences comprises: means for comparing whether an absolute value of a slope difference of lines determined by AOI feature points is less than a predetermined threshold; and means for grouping these AOI feature points into the same group if the absolute value of the slope difference is less than the predetermined threshold.

Likewise, device 600 can be integrated on positioning device 520 or on server 530.

Devices 200, 400, and 600 according to the embodiments of the present invention can be implemented in software, hardware, firmware, circuitry, DSP, and a combination thereof.

According to an embodiment of the present invention, as shown in FIG. 18, there is provided a method 700 of calibrating a positioning device in a space, wherein one or more location points within the space are selected as space feature points. Method 700 may comprise: receiving, in a step S710, relative coordinates of the space feature points in relation to the positioning device; and determining, in a step S720, location parameters of the positioning device in the space based on the relative coordinates, so as to calibrate the positioning device.

According to a preferred embodiment of the present invention, a tag capable of emitting ranging signals is placed at the space feature points, and the relative coordinates are obtained by the positioning device based on the ranging signals from the tag. In this way, automatic measurements are achieved.

According to another embodiment of the present invention, as shown in FIG. 19, there is provided a method 800 for calibrating a positioning device. The method may comprise: receiving, in a step S810, absolute coordinates of one or more location points in a space and relative coordinates of the location points in relation to the positioning device; and determining, in a step S820, location parameters of the positioning device in the space based on the absolute coordinates and the relative coordinates, so as to calibrate the positioning device.

According to a preferred embodiment of the present invention, the location points are located in an overlapped coverage area between the positioning device and another positioning device that has been calibrated, a tag capable of emitting ranging signals is placed at the location points, the relative coordinates are obtained by the positioning device based on the ranging signals from the tag, and the absolute signals are obtained by the another positioning device based on the ranging signals from the tag.

According to a further embodiment of the present invention, as shown in FIG. 20, there is provided a method 900 for characterizing an area of interest in a space. Method 900 may comprise: receiving, in a step 910, location parameters of AOI feature points which can characterize the area of interest, wherein the location parameters are obtained by a positioning device deployed in the space; and characterizing, in a step 920, the area of interest based on the location parameters.

According to an embodiment of the present invention, the location parameters are absolute coordinates of the AOI feature points in the space or relative coordinates of the AOI feature points in relation to the positioning device.

According to an embodiment of the present invention, if the area of interest is a circle, the AOI feature points are a center of the circle and an arbitrary point on the circle edge.

According to an embodiment of the present invention, if the area of interest is a polygon, the AOI feature points are vertexes of the polygon.

According to an embodiment of the present invention, if the area of interest is an ellipse, the AOI feature points are a center point of the ellipse, a cross point of a long axis of the ellipse with a ellipse edge, and a cross point of a short axis of the ellipse with a ellipse edge.

According to another embodiment of the present invention, if the area of interest is of an irregular shape, the method comprises: receiving location parameters of at least three AOI feature points on a boundary of the area of interest, the at least three AOI feature points constituting a feature point sequence; and fitting the feature point sequence to characterize the area of interest.

According to an embodiment of the present invention, the fitting of the feature point sequence comprises directly connecting the feature points.

According to a preferred embodiment of the present invention, the fitting of the feature point sequence comprises: grouping the feature point sequences; and fitting the AOI feature points that are grouped into the same group.

According to a preferred embodiment of the present invention, the grouping of the feature point sequences comprises: comparing whether an absolute value of a slope difference of lines determined by AOI feature points is less than a predetermined threshold; and grouping the AOI feature points into the same group if the absolute value of the slope difference is less than the predetermined threshold.

According to an embodiment of the present invention, the fitting comprises a one-order line-fitting algorithm or a high-order curve-fitting algorithm.

The methods and devices of the present invention can be implemented in software, hardware, or a combination of software and hardware. The hardware portion can be implemented using dedicated logic; the software potion can be stored in a memory and executed by a proper instruction executing system, such as a micro-processor, a personal computer (PC), and a mainframe.

The specification of the present invention has been presented for purposes of illustration and description, and is not intended to be exhaustive or limited to the invention in the form disclosed. Many modifications and alterations will be apparent to those of ordinary skill in the art.

Therefore, the embodiments were chosen and described in order to better explain the principles of the invention, the practical application, and to enable others of ordinary skill in the art to understand that all modifications and alterations made without departing from the spirit of the present invention fall into the protection scope of the present invention as defined in the appended claims.

What is claimed is:

1. A system comprising:
    a tag capable of emitting ranging signals, placed at at least two area of interest (AOI) feature points which can characterize an area of interest in a space;
    a positioning device in said space, configured to obtain location parameters of said AOI feature points based on the ranging signals from the tag; and
    a server, configured to characterize said area of interest based on the location parameters of said AOI feature points,
    wherein the server determines location parameters of the positioning device based on the obtained location parameters of said AOI feature points, and
    wherein when said area of interest is of an irregular shape,
    said positioning device is further configured to obtain location parameters of at least three AOI feature points on a boundary of the area of interest by means of the tag, so as to constitute a feature point sequence;
    said server is further configured to fit said feature point sequence so as to characterize the area of interest.

2. The system according to claim 1, wherein said server is further configure to group said feature points sequence and fit said AOI feature points which are grouped into the same group.

3. The system according to claim 2, wherein said server is further configured to compare whether an absolute value of a slope difference of lines determined by the AOI feature points is less than a predetermined threshold, and to group said AOI feature points into the same group if the absolute value of the slope difference is less than the predetermined threshold.

4. A method for characterizing an area of interest in a space, comprising:
    receiving location parameters of at least two area of interest (AOI) feature points which can characterize the area of interest, wherein said location parameters are obtained by a positioning device deployed in the space; and
    characterizing said area of interest based on said location parameters and determining location parameters of the positioning device based on the received location parameters of said at least two AOI feature points,
    wherein when said area of interest is of an irregular shape, the method comprises:
        receiving location parameters of at least three AOI feature points on a boundary of the area of interest, said at least three AOI feature points constituting a feature point sequence; and
        fitting said feature point sequence to characterize the area of interest.

5. The method according to claim 4, wherein said location parameters are absolute coordinates of said AOI feature points in the space or relative coordinates of said AOI feature points in relation to the positioning device.

6. The method according to claim 4, wherein when said area of interest is a circle, and said AOI feature points are a center of said circle and an arbitrary point on the circle edge.

7. The method according to claim 4, wherein when said area of interest is a polygon, said AOI feature points are vertexes of said polygon.

8. The method according to claim 4, wherein when said area of interest is an ellipse, said AOI feature points are a center point of said ellipse, a cross point of a long axis of said ellipse with a ellipse edge, and a cross point of a short axis of said ellipse with a ellipse edge.

9. The method according to claim 4, wherein the fitting of said feature point sequence comprises:
   grouping said feature point sequence; and
   fitting said AOI feature points that are grouped into the same group.

10. The method according to claim 9, wherein the grouping of said feature point sequence comprises:
    comparing whether an absolute value of a slope difference of lines determined by AOI feature points is less than a predetermined threshold; and
    grouping said AOI feature points into the same group if the absolute value of said slope difference is less than the predetermined threshold.

11. The method according to claim 4, wherein said fitting comprises a one-order line-fitting algorithm or a high-order curve-fitting algorithm.

12. A device for characterizing an area of interest in a space, comprising:
    receiving means for receiving location parameters of at least two area of interest (AOI) feature points which can characterize said area of interest, wherein said location parameters are obtained by a positioning device deployed in a space; and
    characterizing means for characterizing said area of interest based on said location parameters,
    wherein the characterizing means determines location parameters of the positioning device based on the received location parameters of said at least two AOI feature points,
    wherein when said area of interest is of an irregular shape, said receiving means further receives location parameters of at least three AOI feature points on a boundary of the area of interest to constitute a feature point sequence;
    said characterizing means further comprises means for fitting said feature point sequence to characterize the area of interest.

13. The device according to claim 12, wherein the means for fitting said feature point sequence comprises:
    means for grouping said feature point sequence; and
    means for fitting said AOI feature points that are grouped into the same group.

14. The device according to claim 13, wherein the means for grouping said feature point sequence comprises:
    means for comparing whether an absolute value of a slope difference of lines determined by AOI feature points is less than a predetermined threshold; and
    means for grouping said AOI feature points into the same group if the absolute value of said slope difference is less than the predetermined threshold.

* * * * *

UNITED STATES PATENT AND TRADEMARK OFFICE
CERTIFICATE OF CORRECTION

PATENT NO.        : 8,694,275 B2  
APPLICATION NO.   : 13/557754  
DATED             : April 8, 2014  
INVENTOR(S)       : Yongcai Wang, Junhui Zhao and Toshikazu Fukushima Page 1 of 1

It is certified that error appears in the above-identified patent and that said Letters Patent is hereby corrected as shown below:

In the Specification

Column 1, Line 57: Delete "beacons when" and insert -- beacons. When --

Column 6, Line 22: Delete "0" and insert -- $\theta$ --

Column 10, Line 64: Delete "$(x_{20}, y_{20}, z_{20})$" and insert -- $(x_{20}, y_{20}, z_{20})$ --

Column 11, Line 13 (Approx.): Delete "$(x_{12}m, y_{12}, z_{12})$." and insert -- $(x_{12}, y_{12}, z_{12})$. --

Signed and Sealed this  
Eleventh Day of November, 2014

Michelle K. Lee  
*Deputy Director of the United States Patent and Trademark Office*